United States Patent [19]

Weber

[11] Patent Number: 4,735,014

[45] Date of Patent: Apr. 5, 1988

[54] METHOD OF AND APPARATUS FOR INDUSTRIAL CULTIVATION, PARTICULARLY OF MUSHROOMS AND ALSO THE SUBSTRATE USED FOR SUCH CULTIVATION

[75] Inventor: Ernst Weber, Lucerne, Switzerland

[73] Assignee: Weber Development Engineering SA, Switzerland

[21] Appl. No.: 864,793

[22] Filed: May 19, 1986

[30] Foreign Application Priority Data

May 20, 1985 [FR] France .................. 85 07572

[51] Int. Cl.⁴ .............................. A01G 1/04
[52] U.S. Cl. ............................... 47/1.1
[58] Field of Search .................. 47/1.1, 78, 73

[56] References Cited

U.S. PATENT DOCUMENTS

| | | | | |
|---|---|---|---|---|
| 3,292,305 | 12/1966 | Stenzel | .................. | 47/1.1 |
| 3,319,988 | 5/1967 | Smith | .................. | 47/73 |
| 3,996,038 | 12/1976 | Toth et al. | .................. | 47/1.1 |
| 4,001,966 | 1/1977 | Metzner | .................. | 47/1.1 |
| 4,152,868 | 5/1979 | Lincoln | .................. | 47/1.1 |

FOREIGN PATENT DOCUMENTS 7902504  3/1979  Netherlands ................ 47/1.1

Primary Examiner—Robert A. Hafer
Assistant Examiner—Bradley M. Lewis
Attorney, Agent, or Firm—Wolf, Greenfield & Sacks

[57] ABSTRACT

(a) The invention relates to a method of and an apparatus for industrially growing particularly mushrooms and also to a substrate used for such cultivation.

(b) A method characterized in that a substrate is used which consists of a mixture based on hemp stalks, the substrate being prepared by impregnation in water, whereupon the substrate is fixed on supports constituting vertical walls, whereupon the apparatus (1) carrying the substrate is placed in an incubation room and then in a growing room.

(c) The present invention has its main application in the mushrooms growing industry.

9 Claims, 1 Drawing Sheet

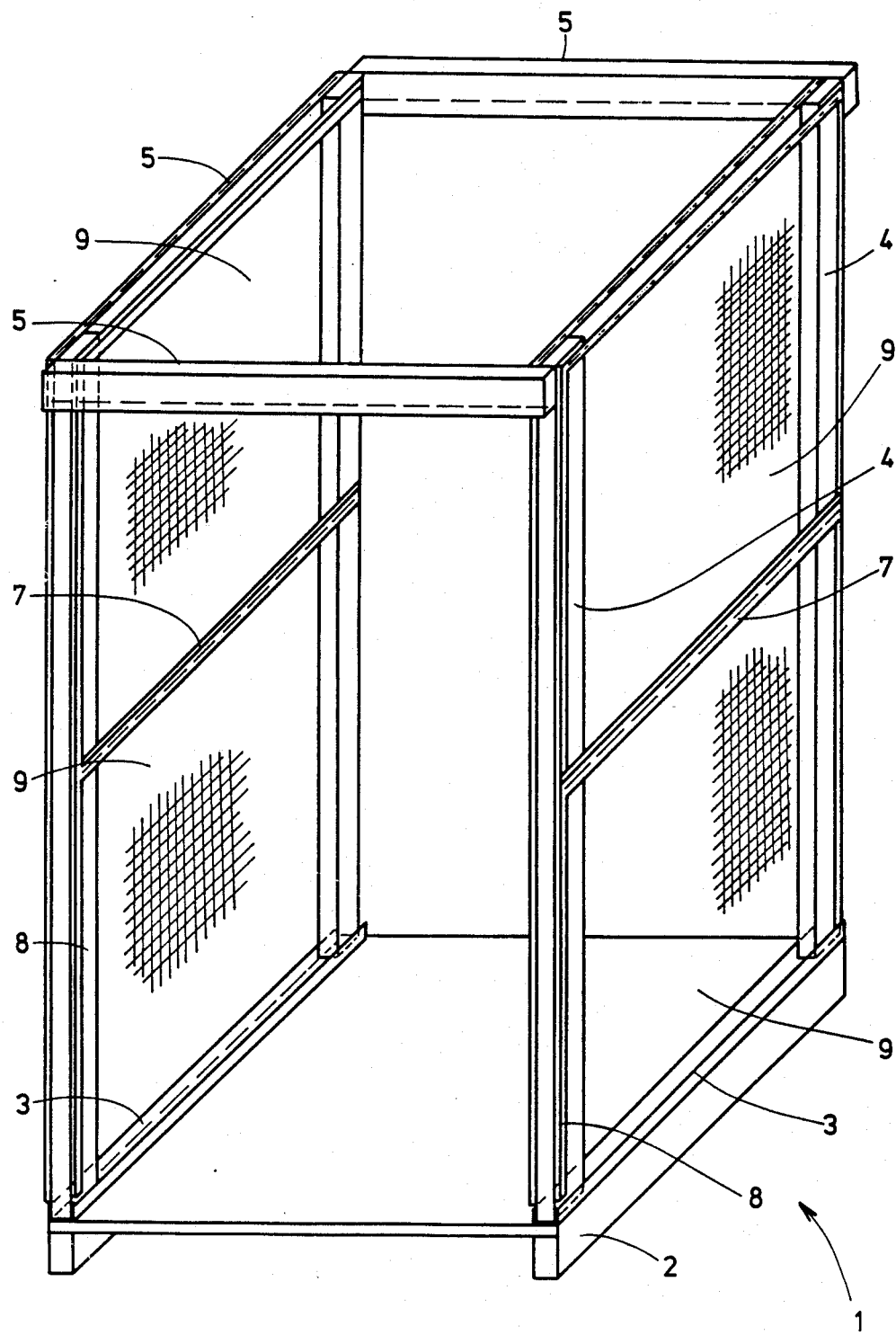

METHOD OF AND APPARATUS FOR INDUSTRIAL CULTIVATION, PARTICULARLY OF MUSHROOMS AND ALSO THE SUBSTRATE USED FOR SUCH CULTIVATION

The invention relates to a method of growing particularly mushrooms industrially as well as to an apparatus and a substrate for such cultivation.

Growing methods are already known which employ substrates prepared from a basis of wheat straw, barley or maize cobs. According to these known methods, the bags or blocks of substrate are prepared which have a thickness of 30 to 40 cm. The bags are stacked one on another to form a wall of an average height of about 1.5 m. According to these known growing methods, the substrates based on wheat, barley or maize call for considerable prior preparation. Indeed, to prepare the substrates, it is necessary to crush the straw into pieces of about 3 to 5 cm. Then the straw must be immersed for at least 48 hours in water to obtain a mixture with the highest possible water content. Finally, it is necessary to pasteurise the straw in a special room for 48 hours. Hence, this growing method which employs substrates based on wheat, barley or maize does not make it possible to achieve a good level of profitability in terms of the surface area which is occupied.

It is therefore the object of the present invention to create an industrial growing method, particularly for mushrooms, which makes it possible to use a far higher performance and much more easily used substrate.

Another object of the present invention is to increase the profitability of the surface area involved, doing so by using a mobile and easily handled growing apparatus.

To this end, the invention relates to an industrial method of cultivating in particular mushrooms, characterised in that a substrate is used which is prepared from a mixture based on hemp stalks, the substrate being prepared by immersion in water. The substrate is fixed on supports which constitute vertical walls, after which the apparatus provided with the substrate is placed in an incubation room and then in a growing room.

According to this method, it is possible to obtain far higher rates of output in relation to the ground area occupied, by virtue of the specific properties of the substrate which is constituted by a mixture based on hemp stalks.

The invention likewise relates to an industrial growing apparatus particularly for mushrooms which makes it possible to apply the method and characterised in that it comprises a base having vertical uprights connected to one another by spacing members, vertical walls consisting of panels covered with wire netting and forming a housing for the substrate being removably placed between the uprights.

Thanks to this apparatus, it is possible to form walls of relatively far greater height. Furthermore, it is possible to have the mushrooms grow in the substrate, the thickness between two wire netting panels being very small, of around 10 to 20 cm, which is far smaller than the bags or blocks of substrate used in the known methods.

The small thickness of the growing walls and their height, which is between 1.8 and 2.2 m, make it possible to obtain outputs per sq.m of ground which are far greater than achieved with apparatus used in conventional industrial growing methods.

According to another characteristic feature of the invention, the apparatus consists of movable walls which can be displaced.

This possibility therefore permits of even greater ease of handling between the substrate preparation phase and movement to the incubation and growing rooms.

According to another characteristic feature of the invention, the apparatus comprises tracks in which the wire netting panels can slide.

The netting panels can therefore be easily withdrawn from or replaced in their supporting structure.

According to another characteristic feature of the invention, the netting panels can be dismantled.

This facilitates filling and emptying of the panels at the end of the growing cycle.

According to another characteristic feature of the invention, the apparatus comprises cutting means adapted for vertical movement by means of slides fixed on the uprights.

The cutting means permit of faster and more rational harvesting of the mushroonms.

According to another characteristic feature of the invention, the cutting means consist of a stretched wire or blade, displacement of which is operated automatically or semi-automatically.

According to another characteristic feature of the invention, the device forms a wall comprising at least two vertical walls and the height of which is between 1.8 and 2.2 m.

According to another characteristic feature of the invention, each vertical wall has a thickness between 10 and 20 cm.

These dimensions therefore make it possible to obtain high levels of output while using far less substrate then in conventional industrial growing methods.

The invention likewise relates to a substrate for industrial cultivation particularly of mushrooms, characterised in that it consists of a mixture of crushed hemp stalks cleaned and with all dirt and dust removed, having a density of about 0.15 in the dry state and of about 0.45 after immersion in water.

This substrate is consequently a far better performer than conventional substrates such as those based on wheat, barley or maize. Indeed, the mixture based on hemp stalks constitutes the ligneous part of the hemp and has a far higher cellulose content than conventional substrates. As it happens, cellulose is an extremely important element in the growing of mushrooms.

Furthermore, another characteristic of the hemp-based mixture is a far higher water retention capacity than conventional substrates.

Furthermore, this substrate according to the invention has a low density and a high water retaining capacity, giving rise to a weight:volume ratio on the moist state which is clearly more interesting than with conventional substrates. It results in the use of a smaller quantity of hemp stalks for equal thickness and therefore means that the costs are likewise more interesting.

Indeed, the substrate according to the present invention is not necessarily crushed at the time the substrate is prepared. The pasteurisationcycle is likewise unnecessary in preparation of the substrate because the hemp stalk based mixture does not have to undergo any pesticide or other treatment during cultivation.

The hemp stalk mixture is likewise cleaned and all dirt and dust removed from it at the factory.

The present invention will be understood more clearly by referring to an embodiment of the industrial growing apparatus which serves as a support for the substrate according to the invention and which makes it possible to employ the industrial growing method of the invention and which is shown diagrammatically and by way of non-limitative example in the single sheet of drawings attached, which is:

a perspective view of the growing apparatus.

According to this drawing, the industrial mushroom growing apparatus 1 consists of a base constituted by a wooden, metal or plastic pallet 2. The pallet 2 may or need not be provided with wheels for displacement of the entire apparatus 1 which forms a wall.

Angle members 3 are fixed on the pallet 2 and permit the fitment of vertical uprights 4 which are connected to one another by spacing members 5. The uprights 4 are made from wood, metal or plastics material and are fixed on the base 2 by wooden, metal or plastics footings. The purpose of the spacing members 5 is to impart rigidity to the assembly formed by the various elements of the apparatus 1.

The apparatus 1 likewise comprises horizontal tracks 7 connecting two parallel uprights 4. It also comprises vertical tracks 8 rigid with the uprights 4. The tracks make it possible to render the vertical walls which consist of wire netting panels 9 movable. The wire netting panels are made from steel or synthetic material. Each of the panels 9 is furthermore dismantleable to facilitate the operations of filling or emptying at the end of a growing cycle. Indeed, each panel 9 forms a housing to receive the substrate in which the mushrooms are grown. The tracks 7 and 8 make it possible to slide the panels 9 and displace them at the start and finish of each growing cycle.

The apparatus 1 likewise comprises cutting means not shown in this drawing. Such cutting means are adapted for vertical translatory movement by means of tracks 9 (sic!) fixed on the uprights 4. The cutting means consists, for example, of a stretched wire or blade, the displacement of which may be operated automatically or semi-automatically. The cutting means may be rigid with the apparatus 1. It is possible likewise to provide cutting means which are independent of the apparatus and which are capable of being adapted to any apparatus.

Generally speaking, the apparatus 1 therefore comprises at least two vertical walls formed of netting panels 9. The thickness of each netting panel 9 is such that the layer of substrate is between 10 and 20 cm thick. The height of the apparatus 1 is comprised between 1.8 and 2.2 m.

The growing apparatus 1 makes it possible to employ the method whereby the substrate is placed in the netting panels 9. This substrate consists of a mixture based on hemp stalks. The substrate is prepared by being impregnated with water, after which the netting panels 9 are placed in position between the uprights 4 of the apparatus 1. Finally, the apparatus 1 carrying wet substrate is placed in a incubation room and then in a growing room.

The substrate used for industrial cultivation of mushrooms according to the invention consists of a mixture based on hemp stalks of which the cellulose content and water retention capacity are far greater than in the case of substrates based on wheat, barley or maize. Thus, by way of example, conventional substrates have a dry density of about 0.43 and of about 0.66 after treatment, that is to say after crushing, immersion and pasteurisation of the straw. The substrate according to the invention has a density in the dry state of around 0.15 and of about 0.45 after immersion in water. Furthermore, it is possible to treat the hemp stalks independently of the actual growing of the mushrooms. Indeed, it is possible to remove all the dust and dirt from, clean and crush the hemp stalks at the factory. The particular nature of hemp stalks makes it possible to obtain levels of output which are around 3 to 5% higher than with conventional substrates.

This output is further improved by the specific design of the apparatus 1 described in this drawing, permitting not only of far greater ease of handling due to the mobility of the netting panels or of the entire apparatus 1, but also to achieve a far greater rate of efficiency per sq.m of surface area than with conventional growing methods. Indeed, the apparatus 1 is of extremely low bulk and makes it possible to form far thinner layers of substrate, so saving on the quantity of substrate used.

I claim:

1. Method for the industrial cultivation of mushrooms comprising the steps of:
    preparing a water soaked hemp stalk substrate implanted with mushroom spores;
    preparing a growing frame by packing said substrate between a pair of mesh panels, said mesh panels being penetratable by mushroom outgrowth and spaced apart from each other; and,
    movably mounting successive pairs of said packed mesh panels next to each other within tracks with the frames aligned in a vertical orientation in a growing room for growing mushrooms out of both panels of each of said growing frames.

2. The method of claim 1 wherein said step of preparing comprises crushing said hemp stalk substrate into pieces of between about 3 and about 5 centimeters in length and soaking said substrate in water for less than about 48 hours.

3. The method of claim 2 wherein said selected hemp stalks have a dry density of about 0.15 grams per milliliter.

4. The method of claim 2 wherein each of said pairs of mesh panels are slidably mounted in vertical tracks.

5. The method of claim 4 wherein said successive pairs of panels extend vertically between about 1.8 and about 2.2 meters.

6. Apparatus for the industrial growing of mushrooms comprising:
    a base;
    vertical uprights extending upwardly from the sides of the base;
    spacing members connecting the vertical uprights;
    vertical walls slidably mounted within track means provided on the vertical uprights;
    the vertical walls comprising a pair of substantially parallel spaced mesh panels, each panel being penetratable by mushroom outgrowth; and,
    a mushroom growing substrate packed within the spaces between the spaced apart mesh panels for allowing mushrooms to grow out of both of the spaced apart mesh panels, the mushroom growing substrate comprising hemp stalks.

7. The apparatus of claim 6 wherein the hemp stalks are crushed to a length of between about 13 and about 5 centimeters.

8. The apparatus of claim 7 wherein the hemp stalks are immersed in water and have a wet density of about 0.45 grams per milliliter.

9. The apparatus of claim 6 wherein said mesh panels are spaced apart from each other by between about 10 and about 20 centimeters and extend vertically and upward from between about 1.8 and about 2.2 meters.

* * * * *